March 15, 1955  C. V. JOHNSON  2,703,945
ARTIFICIAL BAIT FOR FISHING
Filed Sept. 12, 1951
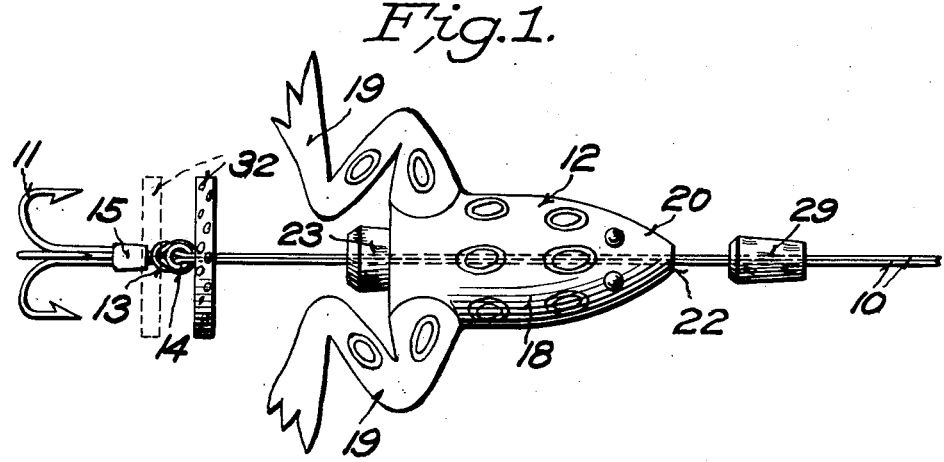
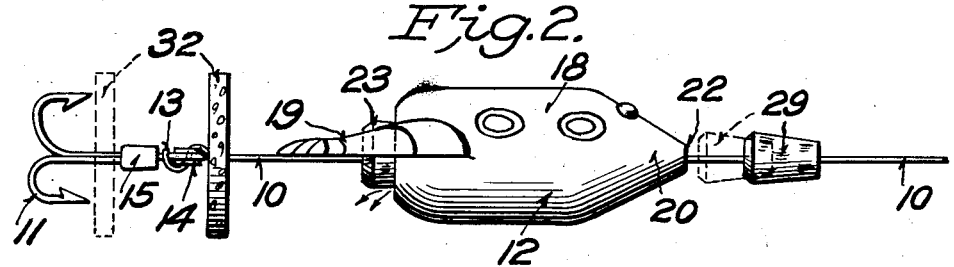
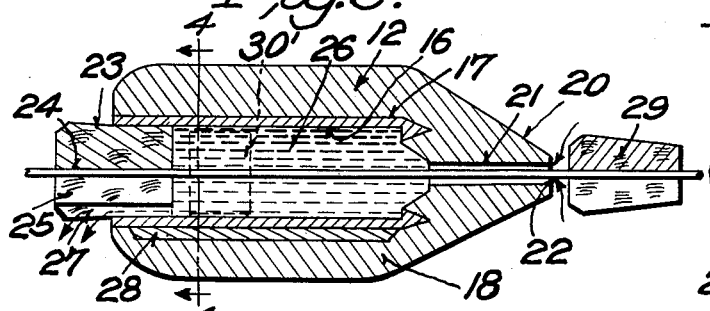
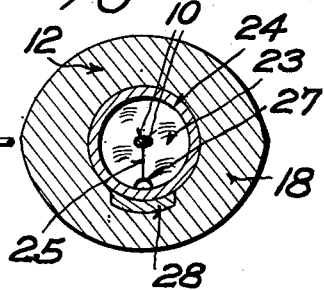
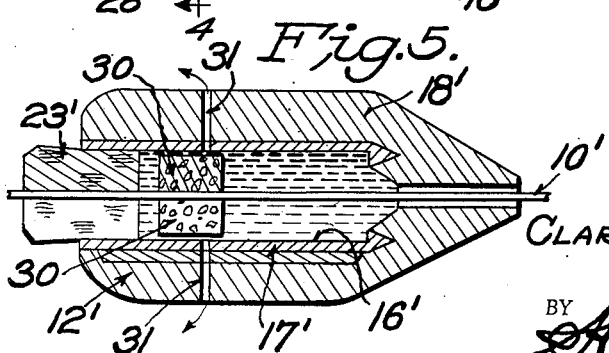
INVENTOR
CLARENCE V. JOHNSON,
BY H. B. Willson & Co.
ATTORNEY

2,703,945
ARTIFICIAL BAIT FOR FISHING

Clarence V. Johnson, Yates Center, Kans.

Application September 12, 1951, Serial No. 246,228

2 Claims. (Cl. 43—42.06)

My invention relates to artificial bait used for catching fish, and more particularly to bait of the plug type commonly used in fishing for bass and other game fish and which may be adapted for use in catching other fish such as catfish.

One object of the invention is to provide an improved combination bait of this character of simple and relative inexpensive construction in which lure material carried thereby may be quickly and easily changed according to the kind of fish it is desired to catch.

Another object of the invention is to provide an improved bait to hold a liquid lure, a solid or powdered soluble lure or a disintegrable solid lure with effective means for controlling the rate of discharge of such lure from the body of the plug or bait so that it may be used for a long period of time without the need of refilling it.

Another object is to provide a bait of the above indicated character in which the discharging liquid lure or particles of the soluble or disintegrable lure will be directed against a cellular absorbent disk of sponge rubber or the like which also serves as a weed guard for the gang of hooks carried by the rear part of the bait.

Another object is to provide a bait of the above indicated character which may be readily filled by using a spoon or fork so that the hands need not come in contact with an odoriferous lure such as Limburger cheese, asafoetida, blood or the like.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a top plan view of an improved artificial bait embodying my invention;

Fig. 2 is a side or edge view;

Fig. 3 is a detail longitudinal sectional view;

Fig. 4 is a transverse section on line 4—4 of Fig. 3 on an enlarged scale;

Fig. 5 is a view similar to Fig. 3 showing a modified form of the body of the bait.

My improved bait comprises a central longitudinal member or leader 10 carrying at one end a fish hook 11 and adapted to have its other connected by a swivel or other means to a fishing line and a body 12 which is shiftable along the leader. The latter is preferably formed by two flexible strands of gut or plastic and has at one end a loop 13 detachably connected to an eye 14 on the shank of the hook as seen in Figs. 1 and 2. While the hook may be of the single or multiple type, I preferably use a gang hook as shown with a cylindrical enlargement or boss 15 on its shank adjacent its eye 14. By providing the double leader with the loop 13 it is possible to quickly apply and remove any kind of a hook having an eye at the end of its shank, as will be understood upon reference to Figs. 1 and 2.

The body 12 is hollow having a central longitudinally extending chamber 16 in which air may be confined when it is desired to have the bait float and travel near the surface of the water, or in which a liquid, a powdered or a soluble lure may be placed and discharged gradually from the rear portion of the bait as hereinafter described.

The body 12 is preferably composed of an inner cylindrical section 17 which forms the chamber 16 and an outer section or covering 18 which may be shaped to simulate a fish, animal, insect or the like. As shown, the outer section 18 simulates a frog with flexible legs 19 extending rearwardly and outwardly from a substantially cylindrical body portion with a forwardly tapering or frusto-conical shaped front end 20. The frog is suitably colored, its bottom being preferably white and its top green and provided with colored spots and eyes as shown. The rigid inner section or shell 17 may be made of lightweight metal or suitable plastic. The outer section 18 is preferably molded upon it and may be made of suitable plastic, rubber or rubber-like material which is soft and somewhat elastic. The tapered front end projects beyond the front end of the rigid section 17 and is formed with a central bore 21 coaxial with the chamber 16 and into which its rear end opens while its front end opens through the flat extremity 22 of the section 18. The bore 21 is of slightly larger diameter or cross sectional shape than the leader 10 so that a small amount of water may flow through it along the leader when the bait is drawn through the water.

The lure is placed in the chamber 16 through its open rear end and is confined therein by a removable closure 23 in the form of a substantially cylindrical plug of cork, yieldable plastic or rubber inserted in the rear end of the section 17, the latter terminating in a flat rear portion of the body 12 between the flexible legs 19. The plug 23 is formed with a central longitudinal bore 24 through which the leader extends, and to permit the somewhat elastic plug to be readily applied to the leader, it may be formed with a radially disposed longitudinal slit 25 extending from the bore 24 to the outer surface of the plug. The walls of the slit 25 will be in tight contact when the plug is forced into and frictionally held in the tubular inner section 17 but when it is outside of the latter it may be sprung laterally on to and off the leader. While the bore 24 may be of larger cross sectional size than the leader to form a liquid passage around the latter, it is shown in Fig. 4 as of a size to snugly engage the double leader so that the bait will be frictionally held in an adjusted position on the leader.

The lure is indicated at 26 in Fig. 3 as a liquid such as blood but it may be in powdered or solid form and capable of dissolving or disintegrating in the water that enters through the bore 21. The lure is to be gradually released from the chamber 16 preferably at or near its rear portion. That may be accomplished in different ways. As shown in Figs. 3 and 4 the closure plug may be formed with an exterior longitudinal groove or channel 27 through which a small quantity of the lure with the water may be permitted to gradually escape from the bait as indicated by the arrows. The plug may be turned to cause the discharge at the bottom, top or side of the bait and of course a plurality of spaced grooves may be used. In order to cause the bait to travel with its top side up a strip of lead or other heavy material may be positioned in the body along the bottom of the section 17.

For the purpose of controlling the rate of discharge of the lure I provide a plug 29 on the leader in front of the flat end 22. The plug is slidable on the leader and frictionally held in any adjusted position. By adjusting it to dispose its flat rear end closer to or further from the front end of the bore, the amount of water entering the chamber 16 may be varied, and when said end is in contact with the flat portion 22 the front end of the chamber will be closed. The plug 29 thus serves as a valve member and may be of cork, rubber or the like. If desired it may have a longitudinally and radially extending slit similar to the slit 25 so that it may be sprung laterally on to and off of the leader. The bore in valve plug 29 receives the leader snugly so that it will remain in an adjusted position. Both the plugs 23 and 29 may be colored red or given some other color to contrast with the colors on the body 18.

In Fig. 5 the split plug 23' is not provided with a groove 28 so that it completely closes the rear end of the chamber 16', and to permit of the gradual escape of the water and lure one or more radial holes 31 may be formed through the inner section 17' and outer section 18' of the bait body. These discharge openings 29 may be variously arranged around and throughout the length of the body 12', but are preferably disposed near the rear portion. In Fig. 5 I also show a cylindrical plug 30 of foam or sponge rubber or plastic shiftably mounted on the leader 10' within the chamber 16'. The plug 30 is of slightly less diameter than that of the chamber 16', and its cellular and porous nature retards the passage of the water and lure through it and through the holes 31. A similar plug 30' of any desired length is shown in Fig. 3 in dotted lines. In this form the plug 30' is relatively short and is used close to the plug 23 to confine the loose lures in the forward portion of the chamber and to prevent larger particles of the lure from clogging the groove 27. In all other respects the form shown in Fig. 5 is the same as the first described form.

I preferably use in rear of the body 12 a cellular and porous disk 32 which will tend to catch and hold particles of the lure discharged from the groove or grooves 27. The sponge-like disk 32 has a central opening to receive the leader 10 and due to its elastic nature it may be sprung over the hook eye 14 as well as the boss 15. The disk may therefore be positioned as shown in full lines in Figs. 1 and 2 and will be retained against the eye 14 as the bait is drawn through the water. However it may be shifted to either the dotted line position shown in Fig. 1 or the dotted line position shown in Fig. 2. This disk has a diameter slightly greater than the diameter of a circle passing through the points of the three hooks of the gang hook 11 so that it will also serve as an effective weed guard or deflector for the hook. When in the dotted line position in Fig. 2 it will be in contact with the points of the hook and thus retain on the hook any worms, shrimp, pealers or the like which may be placed thereon. In the drawings the body 12 is shown as spaced at an extreme distance from the hook 11, but these parts may be disposed close to each other since the frictional engagement of the plug 23 with the leader permits the body 12 to be adjusted along the leader. The disk 32 is preferably colored red or given some bright color to attract fish to the bait.

From the foregoing it will be seen that the bait may be used as a surface bass plug when empty or it may be loaded with a lure like blood, Limburger cheese, asafoetida, etc. to attract catfish and other fish. When the relatively large plug 23 is removed from the chamber 16, the latter may be easily filled with the lure by using a spoon or fork so that the hands need not be soiled or come in contact with the lure. By adjusting the friction held plug 29 with respect to the front end of the bore 21, the amount of water passing through the bait may be readily controlled. The bait may therefore be used over a long period of time without needing refilling. By adjusting the plug 29 to close the bore 21 when the chamber 16 is empty, air will be substantially confined in the chamber, thus increasing the tendency of the bait to float. It is obvious that the air will be more effectively confined in the chamber if the plug 23' without an external groove is substituted for the plug 23 in the form shown in Fig. 3 when the plug 29 is positioned to close the front end of the bore 21. It is also obvious that when the bore 24 of the closure plug 23 of Fig. 3 or 23' of Fig 5 is of larger cross sectional size than the leader to permit the escape of water and lure through said bore, the body 12 of the bait will slide rearwardly on the leader until the legs 19 engage the disk 32 or the plug 23 engages the eye of the hook.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:
1. In an artificial bait, a flexible leader for attachment at one end of a fishing line and having a hook at its other end, a plug bait adjustable along said leader to fixed positions at different distances from said hook, said plug bait comprising an elongated body provided with a central longitudinally extending chamber of a size to hold a substantial quantity of a liquid or other lure material mixable with water, said chamber being cylindrical and defining an opening through the rear of said body to serve as a filling opening for said chamber, the front portion of said body extending beyond the front end of said chamber and having a central bore extending therethrough coaxial with and opening into the front end of said chamber, said leader extending through said chamber and said bore, the latter being of greater cross sectional area than said leader, thereby permitting water to pass along said leader through said bore and enter said chamber when the bait is pulled through the water, a closure plug for said chamber slidable along the rear portion of the leader projecting from said chamber, said closure plug being of compressible material to frictionally retain it in the rear end of said chamber to close said filling opening and to frictionally grip said leader to selectively hold both the closure plug and the bait body at one of said fixed positions from said hook, there being provided adjacent the rear of the bait means for the gradual escape of a mixture of the lure and water from said chamber, and a valve plug of compressible material frictionally slidable along the front portion of said leader projecting from said bore, said valve plug being adjustable to different fixed distances from the front opening of said body defined by said bore to vary the amount of water entering said chamber, and means for the gradual escape of the lure and water mixture comprising at least one longitudinal groove in the surface of the said closure plug at the rear of said chamber.

2. The structure of claim 1 in which said leader is a double gut leader with its rear end forming a loop and said hook is a gang hook having an eye on its shank removably engaged with said loop on the leader, and a disk of resilient, absorbent sponge material having a central hole to snugly receive the projecting rear portion of said leader and shiftable along the latter and the shank of said hook and frictionally retained in an adjusted position to the rear of said plug bait and forwardly of the hook points, said disk having a diameter slightly greater than the spread of the hooks of said gang hook to deflect weeds from the same, said disk also being in the path of the lure material discharged with the water from said chamber.

References Cited in the file of this patent

UNITED STATES PATENTS

| | | |
|---|---|---|
| 717,681 | Hodge | Jan. 6, 1903 |
| 771,263 | McCord | Oct. 4, 1904 |
| 1,393,617 | Frame | Oct. 11, 1921 |
| 1,454,820 | Readle | May 8, 1923 |
| 2,091,457 | Sauer | Aug. 31, 1937 |
| 2,155,335 | Sleeper et al. | Apr. 18, 1939 |
| 2,189,958 | Middlemiss | Feb. 13, 1940 |
| 2,225,676 | White | Dec. 24, 1940 |
| 2,298,811 | Sisco | Oct. 13, 1942 |
| 2,492,557 | Deimler | Dec. 27, 1949 |